Patented Aug. 2, 1932

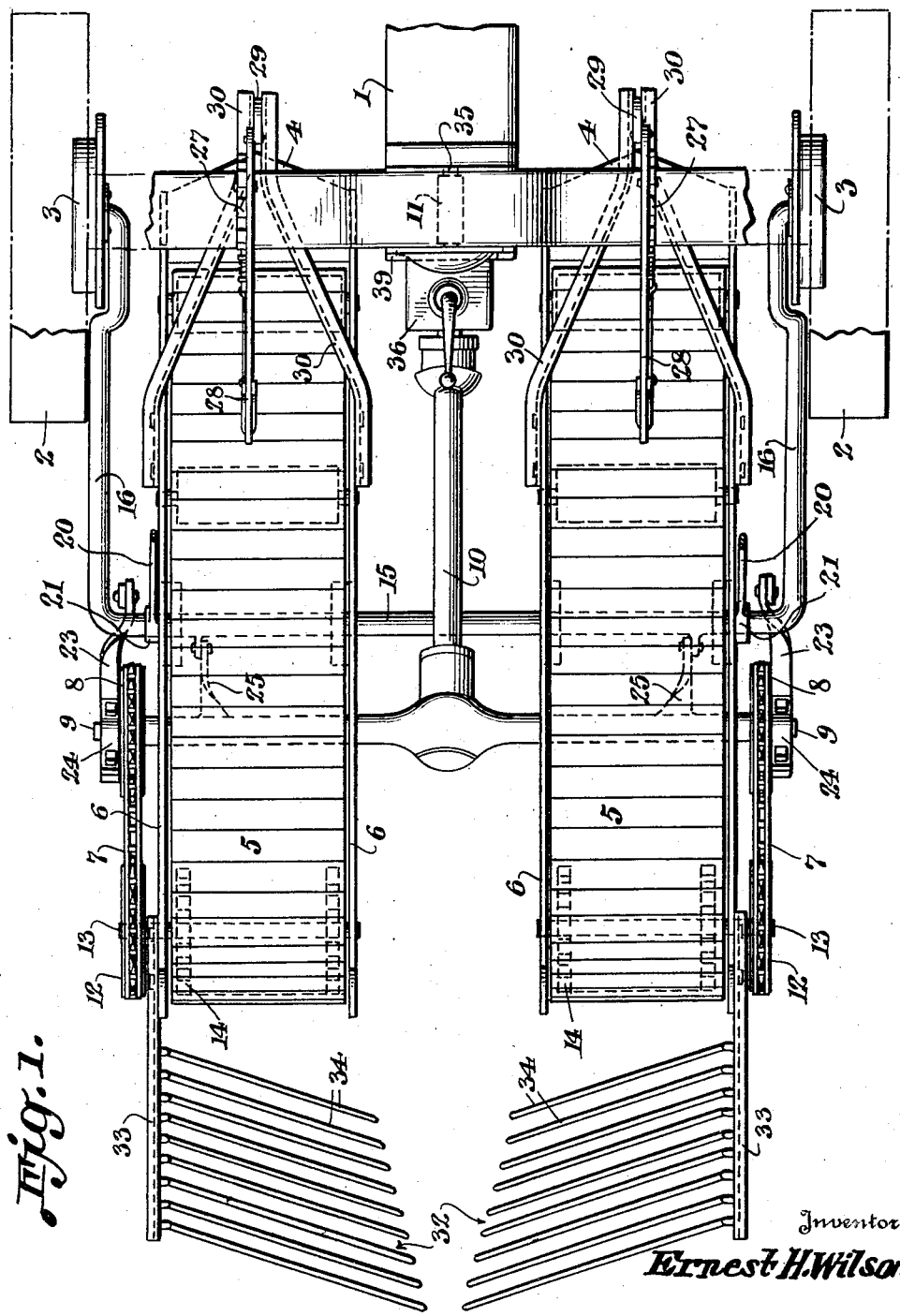

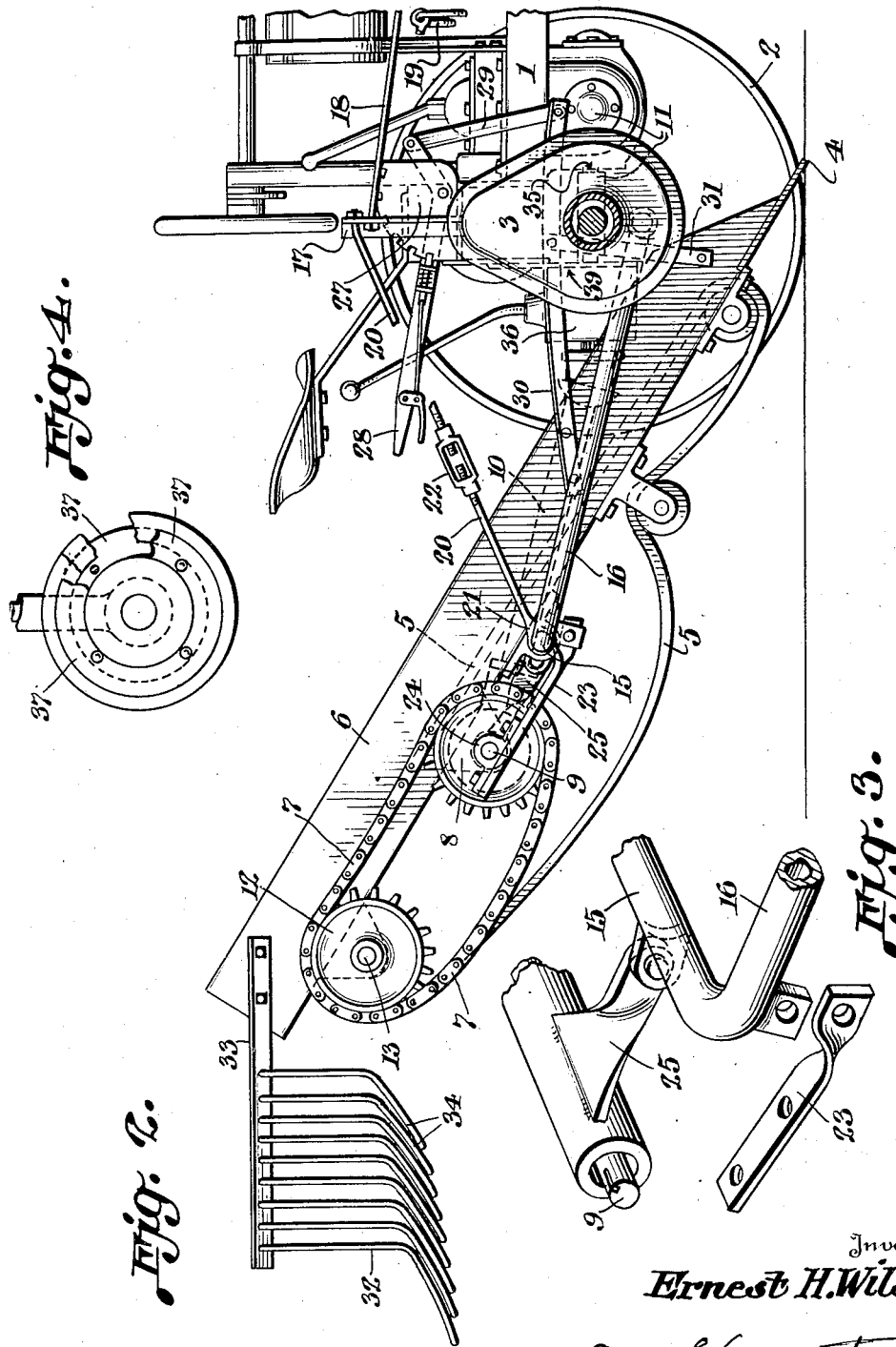

1,869,641

UNITED STATES PATENT OFFICE

ERNEST H. WILSON, OF HASTINGS, FLORIDA

MECHANISM FOR ATTACHING POTATO DIGGERS TO A TRACTOR

Application filed June 19, 1931. Serial No. 545,588.

My invention relates to an attachment which will permit hanging of two diggers of any make on certain well known types of tractor whereby a more rapid and efficient operation of the digging mechanism may be obtained. It is also an object of my invention to provide novel means for discharging the vines in a roll at the center of the machine. I attain these and other objects of my invention by the mechanism described in the accompanying drawings, in which—

Figure 1 is a plan view of my invention, a portion of the tractor to which it is attached being shown;

Fig. 2 is a side elevation of the invention;

Fig. 3 is a detail of the two hinge connections between the draw-bar and the differential shaft housing; and Fig. 4 is a side elevation of the front wheel of the tractor showng the weights which I have devised and attached to over-balance the weight of the potato digger at the rear end of the digger.

Like numerals designate like parts in each of the several views.

Referring to the accompanying drawings there is illustrated a conventional tractor body 1 having tractor wheels 2 and conventional gear housings 3. There are also illustrated potato diggers of standard make having the usual digger blades 4 and endless elevator conveyors 5 mounted in the conventional potato digger frames 6. I provide standard endless chains 7 for power driving of the elevator conveyors, the chains being actuated by the driving gears 8 mounted on the auxiliary differential shaft 9 which in turn is driven by the driving shaft 10 operated from the power takeoff 11 of the tractor. The chains 7 drive the gears 12 on shaft 13, this shaft carrying suitable sprockets 14 within the frame of the digger, these sprockets engaging the spaced bars of the elevator conveyors 5 to operate the elevator conveyors. The drive shaft 10 is of shorter than conventional construction to bring the differential shaft 9 close to the body of the tractor to provide a compact structure and also prevent the weight of the diggers from extending far to the rear of the tractor.

I provide a novel main support or drawbar 15 extending under the digger frame 6 and functioning as a means for adjustably supporting same at a desired height. The draw-bar 15 is round in cross section to give the necessary strength, and is provided with outturned ends 16 which are pivotally mounted on the gear housings 3 and shaped to give width for digger frames.

I provide an angle iron upright 17 fastened to the frame of the tractor. I provide a front brace rod 18 extending from the upper end of the angle iron upright to the forward end of the tractor frame to which it is suitably secured by a U-bolt 19. I provide a rear brace rod 20 extending from the upper end of the angle iron upright 17 to the main support or draw-bar 15 which is loosely mounted in the ring end 21 of the rear brace rod. This loose connection permits of laterally shifting the position of the digger mechanism for operating on wider or narrower rows of potatoes. The rear brace rod 20 is provided with a suitable turnbuckle 22 for adjusting the length of the brace rod and thus raising or lowering the draw-bar and consequently adjusting the angle of the diggers. I provide a link 23 loosely mounted on the draw-bar at its lower end and terminating at its upper end in a bearing 24 in which the end of the auxiliary differential drive shaft 9 is mounted. The capability of this link for pivotal movement permits of the adjustment of the height of the draw-bar by means of the adjustable rear brace rod 20. I also provide intermediate hinge links 25, rigidly attached at one end to the differential housing and at the other end hingedly connected to the draw-bar 15. The upper end of the rear brace rod 20 is affixed to the upper end of angle iron upright 17.

I provide a gear segment 27 for the hand lever 28. Pivotally mounted to the lower end of the hand lever 28 is a link 29, which in turn is pivotally attached to lifting or elevating arms 30, which are secured to opposite sides of the potato digger. I also provide braces 31 extending from the arms 30 to the frame 6 of the potato digger.

Mounted at the rear of the elevator conveyor is a novel vine discharging device 32. This device consists of a bar 33 affixed to the frame of the digger and carrying a series of spaced, downwardly curved and rearwardly slanting vine rods 34 of graduated length, being shorter at the front and gradually increasing in length to the rear rod.

A similar reversely arranged vine discharge device is affixed to the outer frame of the other potato digger. The bar 33 itself is downwardly curved to bring the vine rods into a lower position relative to the rear portion of the potato digger frame.

Like hand levers are provided on each side of the machine within convenient grasp of the operator and like independent mechanisms operatively connected with each hand lever are provided to permit of independent control of each of the diggers by the operator, as shown in the drawings.

The potato vines and potatoes which are dug by the digger blades 4 are conveyed rearwardly over the elevator conveyors 5 the dirt being shaken off by the conveyor mechanism and the potatoes and vines being tossed by the conveyor to the vine discharge devices 32 whence they are delivered by the vine rods 34 to form a central row back of the machine. I provide a hanger 39 from the differential housing of the tractor to the power takeoff drive shaft 35 supporting the transmission 36. It will be noted that I provide a hand lever for independently controlling the height of each of the diggers, this being to permit of adjusting the diggers to work in rows at different levels or in case the machine is tilted to a lower position on one side than on the other. A rearward movement of the hand lever raises the point of the digger, and vice versa.

The draw-bar 15 supports the weight of the diggers and the turnbuckle 22 in the rear brace rod 20 permits of adjusting the height of the rear portion of the draw-bar and this in turn adjusts the height of the frames of the potato diggers.

When digging in soft soil the turnbuckle 22 is operated to lengthen the brace rod 20 and thus lower the rear portion of the draw bar 15 and consequently of the entire body of the potato diggers, including the blade points 4. When working in heavier soil it is desirable to raise the potato diggers somewhat and this is accomplished by adjusting the turnbuckle to bring the draw-bar 15 to a higher level and thus raise the potato digger mechanism to a higher plane. In operating the potato digger over a grassy potato field it would be desirable to elevate the potato diggers and this mechanism would be useful under those conditions.

As the potato diggers are of considerable weight it is of advantage to have them arranged close to the tractor and the draw bar and chain drive mechanism disclosed permits of attaining this advantageous result. The construction described permits of bringing the potato diggers up close and under the tractor body as shown in the drawings. The drive shaft 10, I have substantially shortened to bring the potato conveyor drive mechanism and consequently the digger mechanism as a whole close up to and in part under the tractor body. The drive shaft 10 which I use is 18 inches shorter than the usual drive shaft.

The usefulness of this extra transmission 36 is for speeding up the elevator chains in operating the potato diggers on wet or grassy potato fields where speed is needed in order to shake out the dirt and grass from the potato vines.

In some types of tractors it is necessary to mount a heavy weight 37 in the front wheel to counteract the weight of the potato diggers at the rear of the tractor. This weight fits within the outer part of the double front wheel. It is a casting, the weight of which is carried by the concave of the hub and bolted to the spokes by four eye bolts to hold it in position. This weight is in the form of two discs, one attached to each side of the double wheel.

The term "potato diggers" as used in the succeeding claims is to be construed as referring to the standard diggers including digger blades, endless conveyor, a frame in which the endless conveyor is mounted and means for driving the endless conveyor.

What I claim is,—

1. In an apparatus of the class described, the combination with a tractor, of a pair of conventional potato diggers, a draw-bar having its forward ends pivotally mounted in the gear housing of the tractor and having its rear portion extending under the frames of the potato diggers, and an adjustable brace rod extending from the tractor to the rear portion of the draw-bar and adapted to adjustably raise and lower same as desired.

2. In apparatus of the class described, the combination with a pair of potato diggers arranged with their front ends extending under the rear portion of a tractor, a drive shaft of shorter than conventional construction to provide a compact machine and to prevent the weight of the diggers from extending far to the rear of the tractor, elevating arms attached to opposite sides of each of the potato digger frames, braces connecting said arms with the forward portion of the frames of the potato diggers, hand levers operatively connected with the forward ends of the arms for operating same to raise and lower the front blades of the potato diggers, said hand levers being independently operable for independently controlling the potato diggers.

3. In combination with the apparatus defined in claim 2, means permitting of lateral shifting of the potato diggers to operate on rows of different widths.

4. In an apparatus of the class described, the combination with a tractor of a pair of conventional potato diggers, a draw-bar having its forward ends pivotally mounted in the gear housing of the tractor and having its rear portion extending under the frames of the potato diggers, an adjustable brace rod extending from the tractor to the rear portion of the draw-bar and adapted to adjustably raise and lower same as desired, elevating arms attached to opposite sides of each of the potato digger frames, braces connecting said arms with the forward portion of the frames of the potato diggers, hand levers operatively connected with the forward ends of the arms for operating same to raise and lower the front blades of the potato diggers, said hand levers being independently operable for independently controlling the potato diggers.

5. In combination with potato digging mechanism of the type described, potato and vine discharge mechanism comprising bars attached to the outer sides of a pair of potato digger frames, inwardly extending downwardly curved and rearwardly slanting vine rods affixed to said bars, said vine rods being graduated in length from shorter rods at the front to longer rods at the rear portion.

6. In apparatus of the class described, the combination of a tractor having a double front wheel, weights mounted in and secured to the spokes of the double front wheel to counteract the weight at the rear end, potato diggers mounted on the rear end of the tractor and having their points positioned under the tractor, a draw-bar having its ends pivotally mounted in the gear housings of the tractor and extending under the frames of the potato diggers, angle iron uprights mounted on the tractor frame, brace rods extending from the top of the angle iron uprights to the front portion of the tractor frame, brace rods extending from the rear of the draw-bar to the tractor frame, and means for adjusting the length of said rear brace rods to adjust the height of the draw-bar and thereby of the potato diggers.

7. In apparatus of the class described, the combination of a tractor having a double front wheel, weights mounted in and secured to the spokes of the double front wheel to counteract the weight at the rear end, potato diggers mounted on the rear end of the tractor and having their points positioned under the tractor, a draw-bar having its ends pivotally mounted in the gear housings of the tractor and extending under the frames of the potato diggers, angle iron uprights mounted on the tractor frame, brace rods extending from the top of the angle iron uprights to the front portion of the tractor frame, brace rods extending from the rear of the draw-bar to the tractor frame, means for adjusting the length of said rear brace rods to adjust the height of the draw-bar and thereby of the potato diggers, the potato diggers having elevator conveyors, a chain drive for said elevator conveyors, an auxiliary differential shaft operating said gears, a relatively short drive shaft operating said differential shaft and connecting same with power takeoff to bring the potato digger mechanism close to and in part under the tractor frame, and a hanger supporting the transmission connecting the drive shaft with the power takeoff.

8. In apparatus of the class described, the combination of a tractor having a double front wheel, weights mounted in and secured to the spokes of the double front wheel to counteract the weight at the rear end, potato diggers mounted on the rear end of the tractor and having their points positioned under the tractor, a draw-bar having its ends pivotally mounted in the gear housings of the tractor and extending under the frames of the potato diggers, angle iron uprights mounted on the tractor frame, brace rods extending from the top of the angle iron uprights to the front portion of the tractor frame, brace rods extending from the rear of the draw-bar to the tractor frame, means for adjusting the length of the said rear brace rods to adjust the height of the draw-bar and thereby of the potato diggers, the potato diggers having elevator conveyors, a chain drive for said elevator conveyors, an auxiliary differential shaft operating said gears, a relatively short drive shaft operating said differential shaft and connecting same with power takeoff to bring the potato digger mechanism close to and in part under the tractor frame, a hanger supporting the transmission connecting the drive shaft with the power takeoff, and hinge links operatively connecting the rear portion of the draw-bar with the auxiliary differential shaft.

9. In combination with potato digging mechanism of the type described, potato and vine discharge mechanism comprising bars attached to the outer sides of a pair of potato digger frames, and inwardly extending curved vine rods on each of the bars, said vine rods being of graduated length for discharging the vines in a roll at the center of the machine.

ERNEST H. WILSON.